(12) United States Patent
Eichinger

(10) Patent No.: US 7,584,934 B1
(45) Date of Patent: Sep. 8, 2009

(54) CLAMP MEMBER FOR A MARINE PROPULSION DEVICE

(75) Inventor: Charles H. Eichinger, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 154 days.

(21) Appl. No.: 11/891,705

(22) Filed: Aug. 13, 2007

(51) Int. Cl.
*F16M 1/00* (2006.01)
(52) U.S. Cl. ........................ 248/640; 114/112
(58) Field of Classification Search ............... 440/112; 248/640, 642
See application file for complete search history.

(56) References Cited

U.S. PATENT DOCUMENTS

| | | | | |
|---|---|---|---|---|
| 3,442,542 A | * | 5/1969 | Watanabe | 403/300 |
| 4,040,378 A | * | 8/1977 | Blanchard | 440/52 |
| 4,236,478 A | | 12/1980 | Mansson | 440/112 |
| 7,033,234 B2 | | 4/2006 | Arvidsson et al. | 440/1 |
| 7,118,434 B2 | | 10/2006 | Arvidsson et al. | 440/88 C |
| 7,182,657 B2 | | 2/2007 | Mansson | 440/52 |
| 7,188,581 B1 | | 3/2007 | Davis et al. | 114/285 |

OTHER PUBLICATIONS

U.S. Appl. No. 11/586,191, filed Oct. 25, 2006, Davis.

* cited by examiner

*Primary Examiner*—Stephen Avila
(74) *Attorney, Agent, or Firm*—William D. Lanyi

(57) ABSTRACT

A clamp member is provided with numerous lightening holes which comprise cavities and depressions formed on an inner surface of the clamp member. Bolt holes are provided through upper and lower surfaces of the clamp member and extend through the cavities. A reduced volume of the clamp member allows it to be manufactured from materials that are generally heavier than aluminum, but less susceptible to galvanic corrosion.

17 Claims, 6 Drawing Sheets

CLAMP MEMBER FOR A MARINE PROPULSION DEVICE

BACKGROUND OF THE INVENTION

1. Field of the Invention

The present invention is generally related to a clamp member for a marine propulsion device and, more particularly, to a clamp member that compresses an elastomeric seal component for a marine propulsion device that extends through the hull of a marine vessel.

2. Description of the Related Art

It is well known to those skilled in the art that marine propulsion devices can be configured to extend downwardly through the hull of a marine vessel. These marine propulsion systems are typically steerable about a generally vertical steering axis. Because of their position relative to the hull of the marine vessel, it is very important that effective seals, or grommets, are used to prevent leakage through the opening that is necessary to allow the marine propulsion device to extend downwardly below the marine vessel. In addition, those skilled in the art of marine propulsion systems are also aware of many other types of seals and grommets used to prevent leakage in conjunction with marine propulsion devices.

U.S. Pat. No. 4,040,378, which issued to Blanchard on Aug. 9, 1977, describes a method and apparatus for installing a marine propulsion device. The system comprises a boat hull including a bottom surface having therein an aperture, a mounting collar having a lower portion which extends through the aperture and which includes an upper end and a flange extending generally horizontally outwardly from the upper end of the lower portion, and a seal sealing the boat hull bottom to the lower portion of the collar.

U.S. Pat. No. 4,236,478, which issued to Mansson on Dec. 2, 1980, describes a drive installation for boats. The assembly comprises a drive assembly with motor and an inboard-outboard drive coupled to the motor, and a motor bed, which has a passage, through which the assembly extends and which is aligned with a hole in the bottom of the boat, through which the assembly extends. The assembly has an elastic sealing ring which is held pressed between the wall of the passage and the outer surface of the assembly.

U.S. Pat. No. 7,033,234, which issued to Arvidsson et al. on Apr. 25, 2006, describes a method of steering a boat with double outboard drives and a boat having double outboard drives. The double individually steerable outboard drive units have underwater housings which extend down from the bottom of the boat. When running at planing speed straight ahead, the underwater housings are set with toe-in. When turning, the inner drive unit is set with a greater steering angle than the outer drive unit.

U.S. Pat. No. 7,118,434, which issued to Arvidsson et al. on Oct. 10, 2006, describes an outboard drive for boats. It includes an underwater housing in which two propeller shafts are mounted and are driven via a first double gearing enclosed in the underwater housing and a second bevel gearing enclosed in a gear housing.

U.S. Pat. No. 7,182,657, which issued to Mansson on Feb. 27, 2007, describes a boat hull with an outboard drive and an outboard drive for boats. A drive unit comprises an underwater housing mounted on the outside of the hull bottom and a gear housing mounted on the inside of the hull bottom and joined to the underwater housing. Between the underwater housing and the gear housing there is fixed a mounting plate which together with a screw down plate with elastic ring inserts, fixes the drive unit to a flange which is made on the inside of a well surrounding an opening in the hull bottom.

U.S. Pat. No. 7,188,581, which issued to Davis et al. on Mar. 13, 2007, discloses a marine drive with an integrated trim tab. The marine drive and marine vessel are described and illustrated with a drive combination having a trim tab with a forward end pivotally mounted to a marine propulsion device.

U.S. patent application Ser. No. 11/586,191 (M10009), which was filed by Davis on Oct. 25, 2006, discloses a marine drive grommet seal which is used to prevent leakage through an opening in a boat hull that is configured to allow a marine drive device to extend downwardly through the boat hull to provide propulsion for the boat.

The patents described above are hereby expressly incorporated by reference in the description of the present invention.

When providing a seal for a marine propulsion device, it is well known that an elastomeric seal can be compressed between two plates in order to inhibit leakage of water past the elastomeric seal. In many applications, it is beneficial to use a clamping member that is light in weight in order to facilitate the handling and assembly of the seal and clamping member in a marine vessel. However, because of corrosion problems, aluminum clamping plates can present serious potential problems resulting from galvanic corrosion of the aluminum material. The use of stainless steel clamping plates, or rings, can avoid the problems of galvanic corrosion, but stainless steel is significantly heavier than aluminum and can present a problem relating to the handling and assembly of the clamping rings. It would therefore be significantly beneficial if a clamping member could be provided for a marine propulsion device which is less susceptible to galvanic corrosion than aluminum, but which is sufficiently light in weight to facilitate its handling during installation and assembly procedures.

SUMMARY OF THE INVENTION

A clamp member of a marine propulsion device, made in accordance with a preferred embodiment of the present invention, comprises an inner surface facing a central axis of a clamp member, an outer surface facing away from the central axis, an upper surface intercepting the inner surface, a lower surface intersecting the inner surface, a flange extending from the clamp member in a direction away from the central axis, a plurality of cavities formed through the inner surface and into the clamp member, an upper plurality of holes extending through the upper surface, and a lower plurality of holes extending through the lower surface. The clamp member can comprise two sections and is preferably configured to conform to a surface of an elastomeric component and to exert a force against the surface of the elastomeric component when a force is exerted on the clamp member in a direction generally perpendicular to and against the upper surface. Each of the plurality of cavities extends a partial distance through the clamp member from the inner surface toward the outer surface. Each of the upper plurality of holes is aligned with an associated one of the lower plurality of holes and with an associated one of the plurality of hole axes. Each of the hole axes extends through an associated one of the plurality of cavities.

In one embodiment of the present invention, it further comprises a plurality of depressions formed through the inner surface of the clamp member and spaced apart from the plurality of cavities. In addition, it can comprise a plurality of bolts, wherein each of the plurality of bolts extends through associated ones of the upper and lower pluralities of holes.

The flange can be tapered from a thickest portion proximate the outer surface to a finished portion at a distal end of the flange. In addition, the two sections of the clamp member can be separated by a plane which is generally parallel to the central axis.

BRIEF DESCRIPTION OF THE DRAWINGS

The present invention will be more fully and completely understood from a reading of the description of the preferred embodiment of the present invention in conjunction with the drawings, in which.

DESCRIPTION OF THE PREFERRED EMBODIMENT

Figure 1:
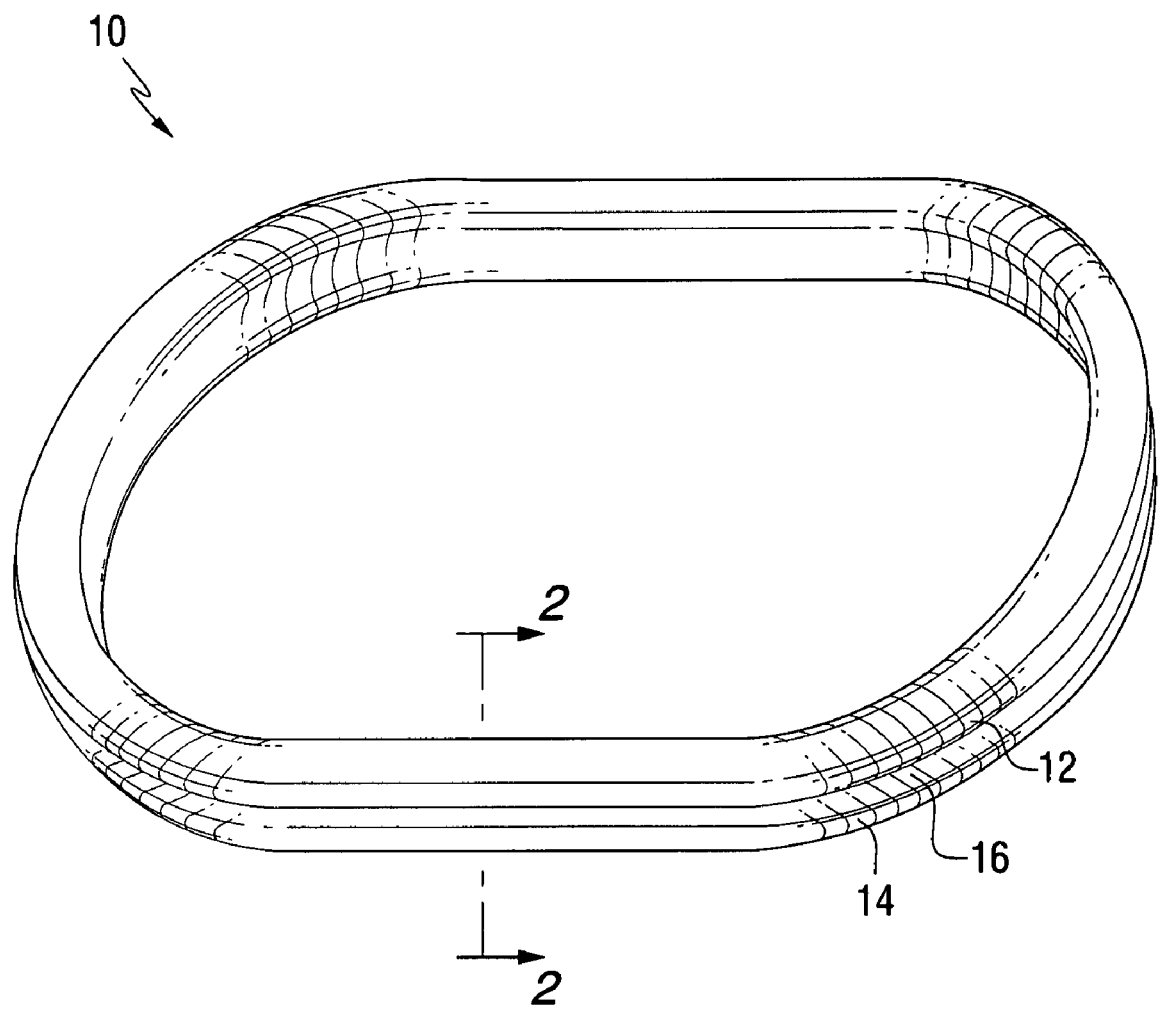
FIG. 1 is an isometric representation of an elastomeric seal which can be used in conjunction with a preferred embodiment of the present invention.

Throughout the description of the preferred embodiment of the present invention, like components will be identified by like reference numerals.

Figure 2:
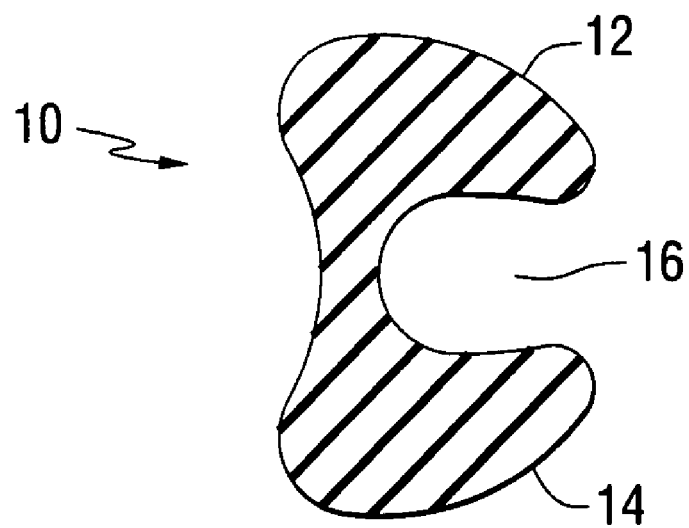
FIG. 2 is a cross-sectional view of the seal shown in FIG. 1.

FIG. 1 is an isometric representation of an elastomeric seal 10, or grommet, that is generally similar to the one that is described in U.S. patent application Ser. No. 11/586,191 which is described above. FIG. 2 is a cross-sectional view of the seal 10. Although the present invention, which will be described in greater detail below, can be used with various shapes of seals, the seal shown in FIGS. 1 and 2 is particularly suited for use in conjunction with the clamp member of the present invention.

With continued reference to FIGS. 1 and 2, the seal 10 comprises an upper lobe 12, a lower lobe 14, and a space 16 between the upper and lower lobes.

Figure 3:
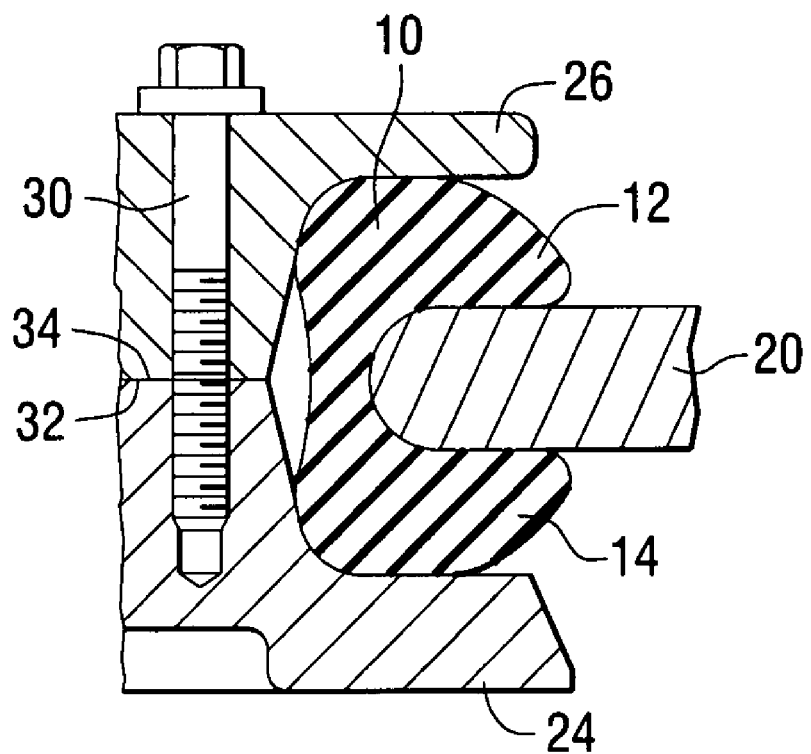
FIG. 3 shows the seal of FIGS. 1 and 2 in combination with upper and lower clamp members.

FIG. 3 shows the seal 10 disposed around a portion 20 of a hull of a marine vessel. A lower clamping plate 24 and an upper plate 26 compress the seal 10 against outer surfaces of the component identified by reference numeral 20 and surfaces of the upper and lower clamping plates, 24 and 26. Bolts are used to attach the two clamping plates, or clamping rings, together. An upper surface 34 of the lower clamping plate 24 is forced against a lower surface 32 of the upper clamping plate 26 when the bolt 30 is tightened. The basic configuration and operation of the components shown in FIGS. 1-3 are described in greater detail in U.S. patent application Ser. No. 11/586,191 and will not be described in further detail herein.

Figure 4:
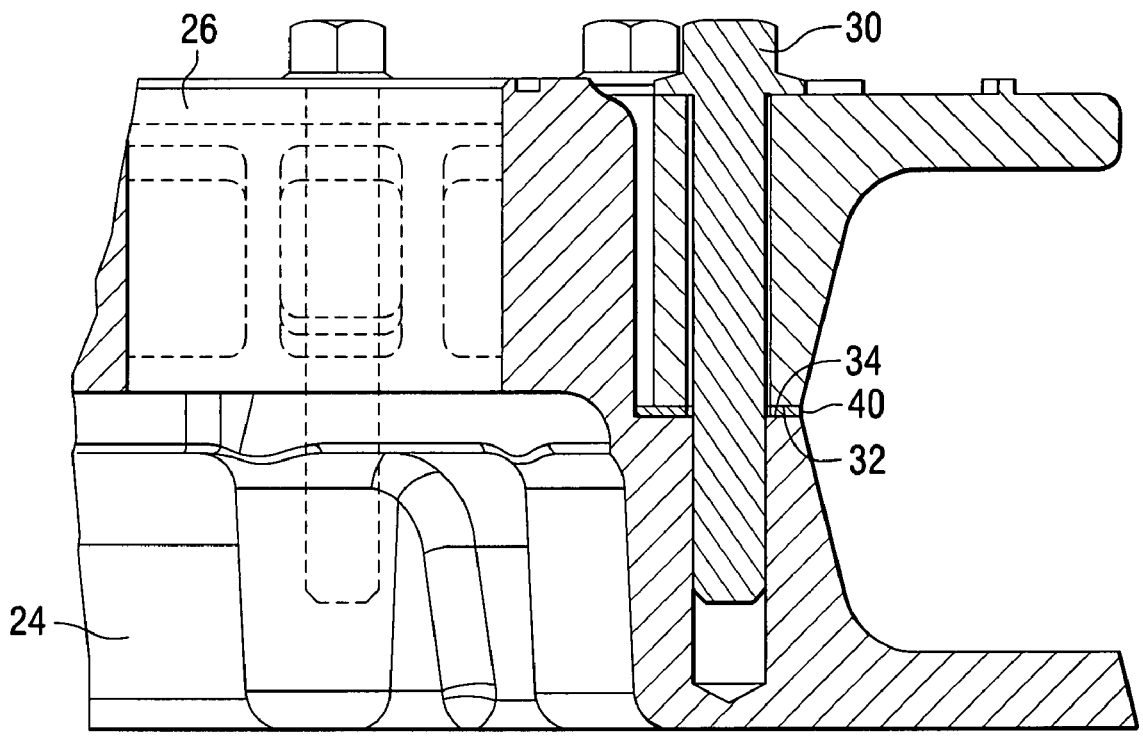
FIG. 4 shows upper and lower clamp members attached together with bolts.

FIG. 4 is a partially sectioned view of a lower clamping plate 24 and an upper clamping plate 26, which are generally similar to those corresponding components illustrated in FIG. 3, but without the seal 10 or the hull component 20. A spacer 40, or gasket, can be provided between the lower surface 32 of the upper clamping plate 26 and the upper surface 34 of the lower clamping plate 24.

Figure 5:
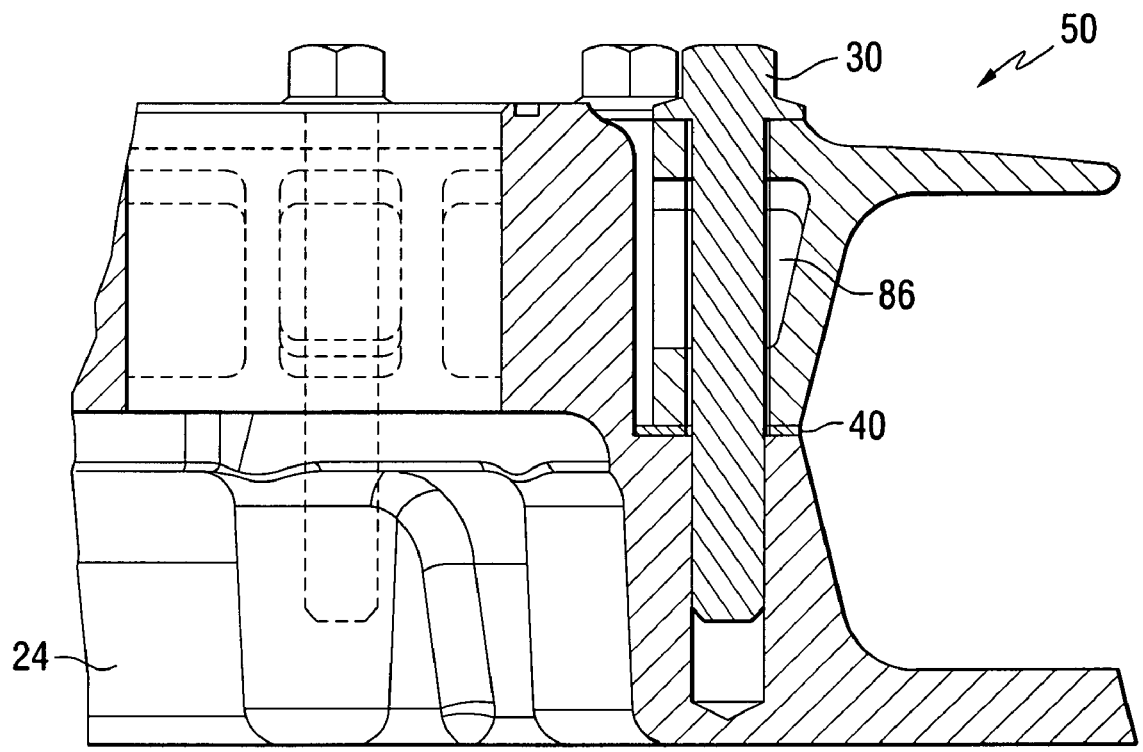
FIG. 5 shows a preferred embodiment of the present invention used in conjunction with a lower clamp member.

FIG. 5 shows a cross-sectional view of an upper clamping plate made in accordance with a preferred embodiment of the present invention. The clamping member 50 in a preferred embodiment of the present invention is made of a material, such as stainless steel, which is less susceptible to galvanic corrosion. This is particularly helpful when the clamping member 50 is used in a saltwater environment. With reference to FIGS. 3 and 5, it should be understood that the region in which the upper clamping plate 26 is disposed, as shown in FIG. 3, is at the bottom portion of the bilge of a marine vessel. Saltwater can collect in this region and exacerbate the galvanic conditions that can occur when many dissimilar metals are commonly wetted by the saltwater. The seal 10 is intended to prevent saltwater from leaking between the seal 10 and the contacting surfaces of the lower mounting plate 24 and the hull structure 20. However, it should be understood that these seals may allow some small degree of saltwater to seep past the contact surfaces described above. In addition, any leakage from other sources can be expected to collect in the lower regions of the bilge. Since the upper clamping plate 26 is located in the very bottom portion of the bilge, it is likely to be subjected to contact with saltwater which, in turn, is also likely to be in contact with dissimilar metals in the bilge. The clamping member 50, made in accordance with a preferred embodiment of the present invention, can also be expected to be similarly located within the lower portions of the bilge. Therefore, it is significantly beneficial if the clamping member 50 can be made of a metal that is less susceptible to galvanic corrosion than aluminum. One metal that is a satisfactory candidate for these purposes is stainless steel. However, stainless steel is much heavier than aluminum. As a result, manipulation of the clamping member during installation and assembly of the marine propulsion devices can be significantly difficult because of the resulting weight of the clamping member. It is the intention of a preferred embodiment of the present invention to significantly reduce the weight of the clamping member 50 in order to facilitate this manipulation and handling during assembly and repair procedures.

Figure 6:
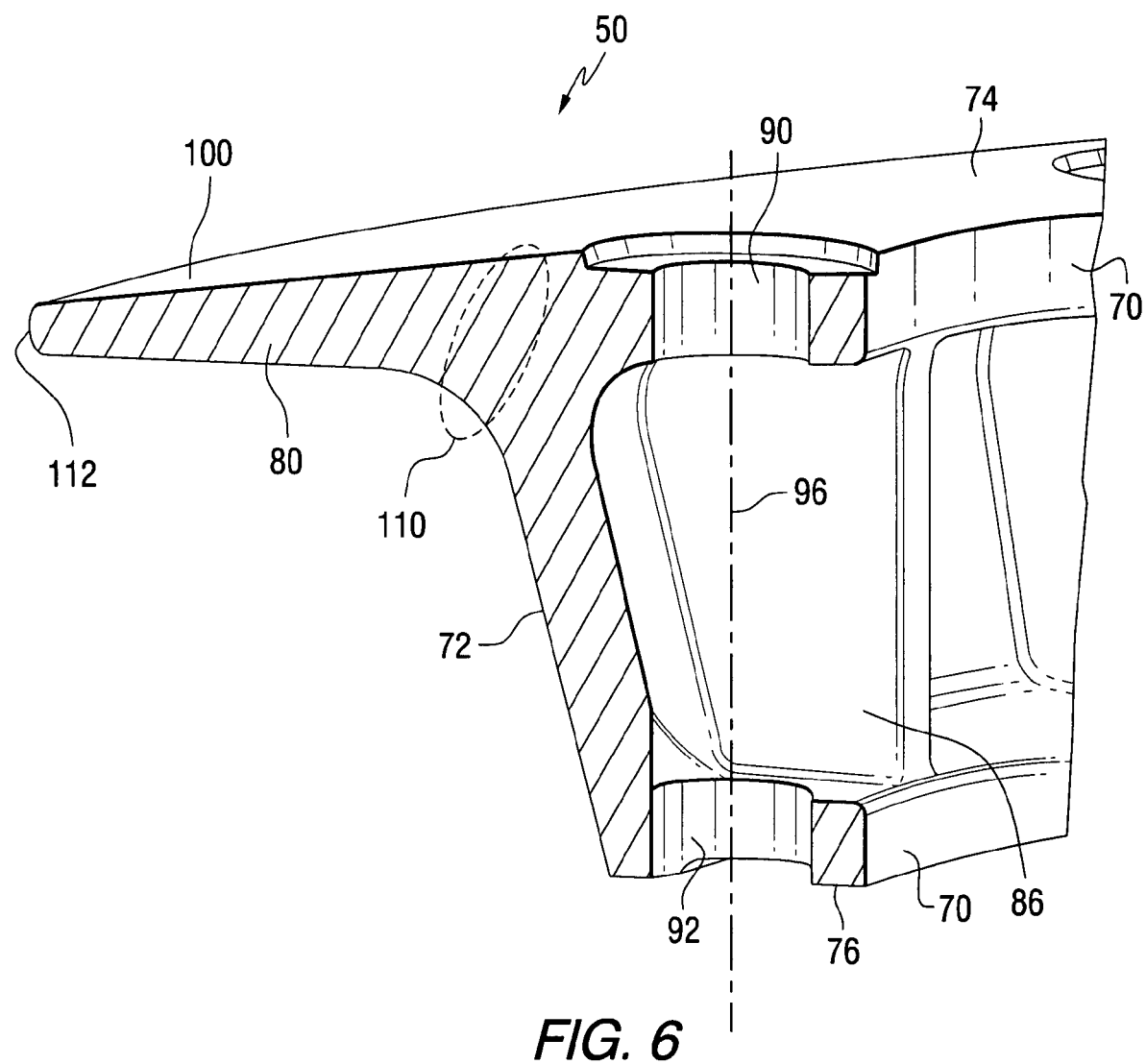
FIG. 6 is a partial section view of a clamp member made in accordance with a preferred embodiment of the present invention.

FIG. 6 is a section view of a clamp member 50 made in accordance with a preferred embodiment of the present invention. It comprises an inner surface 70 and an outer surface 72. The inner surface 70 faces a central axis (not illustrated in FIG. 6) and the outer surface 72 faces away from the central axis. The clamp member further comprises an upper surface 74 which intersects the inner surface 70. A lower surface 76 intersects the inner surface 70 and the outer surface 72. A flange 80 extends from the clamp member 50 in a direction away from the central axis. A plurality of cavities 86 are formed through the inner surface 70 and into the body of the clamp member 50. An upper plurality of holes 90 extends through the upper surface 74 and a lower plurality of holes 92 extends through the lower surface 76. Each of the upper plurality of holes 90 is aligned with an associated one of the lower plurality of holes 92 and with an associated one of a plurality of hole axes 96. Each of the hole axes 96 extends through an associated one of the plurality of cavities 86.

With continued reference to FIG. 6, the flange 80 has a surface 100 which extends contiguously from the upper surface 74. The surface 100 of the flange 80 and the upper surface 74 need not be coplanar in all embodiments of the present invention. In fact, in a particularly preferred embodiment of the present invention, the flange 80 is tapered and this configuration results in the surface 100 of the flange 80 being non-coplanar with the upper surface 74.

Figure 7:
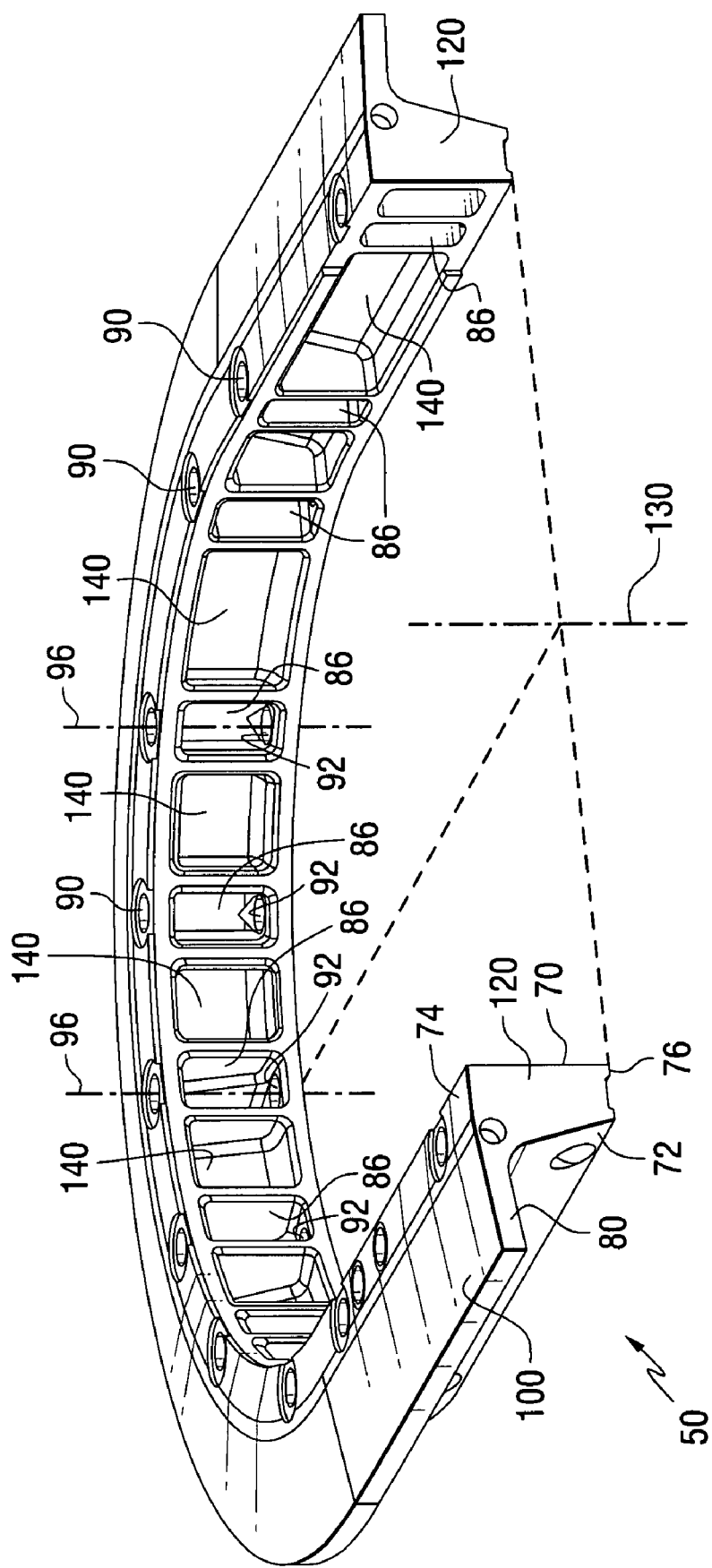
FIG. 7 is an isometric view of a clamp member made in accordance with a preferred embodiment of the present invention.

FIG. 7 is an isometric representation of a clamp member 50 made in accordance with a particularly preferred embodiment of the present invention. With reference to FIGS. 6 and 7, it can be seen that the upper surface 74 is contiguous with surface 100 of the flange 80. It can be seen that the upper and lower plurality of holes, 90 and 92, are aligned according to axes 96 which extend through the cavities 86. In a preferred embodiment of the present invention, the cavities 86 do no extend radially through the entire structure of the clamping member 50 but, instead, extend partially through the radial thickness between the inner and outer surfaces, 70 and 72. These cavities provide a significant reduction in weight of the clamping member 50. In addition, the location of the cavities 86 with respect to the upper and lower plurality of holes, 90 and 92, provide another significant advantage. The manufacturing time required to drill the holes, 90 and 92, is significantly reduced because no drilling is required through the space defined by the cavities 86.

With continued reference to FIGS. 6 and 7, it can be seen that the flange 80 has its surface 100 extending contiguously from the upper surface 74 and, in addition, that the flange 80 is tapered from its thickest portion, identified by reference numeral 110, to its thinnest distal portion 112. This tapering of the flange 80 further reduces the volume of the clamping member 50 and, as a result, its overall weight. In a preferred embodiment of the present invention, the clamp member 50 comprises two sections. One of those sections is shown in FIG. 7 and a similarly configured section would be arranged to abut the surfaces identified by reference numeral 120. These two sections are separated by a plane which is generally parallel to the central axis 130 and coplanar with surfaces 120 shown in FIG. 7. In a preferred embodiment of the present invention, a plurality of bolts 30, such as those shown in FIGS. 3-5, are used to attach the clamp member 50 to a lower clamping plate which is generally similar to that identified by reference numeral 24 in FIGS. 3-5.

As described above, a clamp member made in accordance with a particularly preferred embodiment of the present invention is made of stainless steel in order to avoid the deleterious effects of galvanic corrosion that would otherwise affect clamping members made of alternative materials, such as aluminum. In a particularly preferred embodiment of the present invention, a plurality of depressions 140 are formed through the inner surface 70 and spaced apart from the plurality of cavities 86. These depressions 140 further reduce the overall volume of the clamp member 50 and, as a result, further reduce its weight. The difference between the cavities 86 and the depressions 140 is that the cavities are aligned with the axes 96 that extend between the upper and lower pluralities of holes.

In a particularly preferred embodiment of the present invention, the cavities and depressions are cast in the clamp member when it is manufactured. This reduces the manufacturing effort required to produce the clamp member 50.

Figure 8:
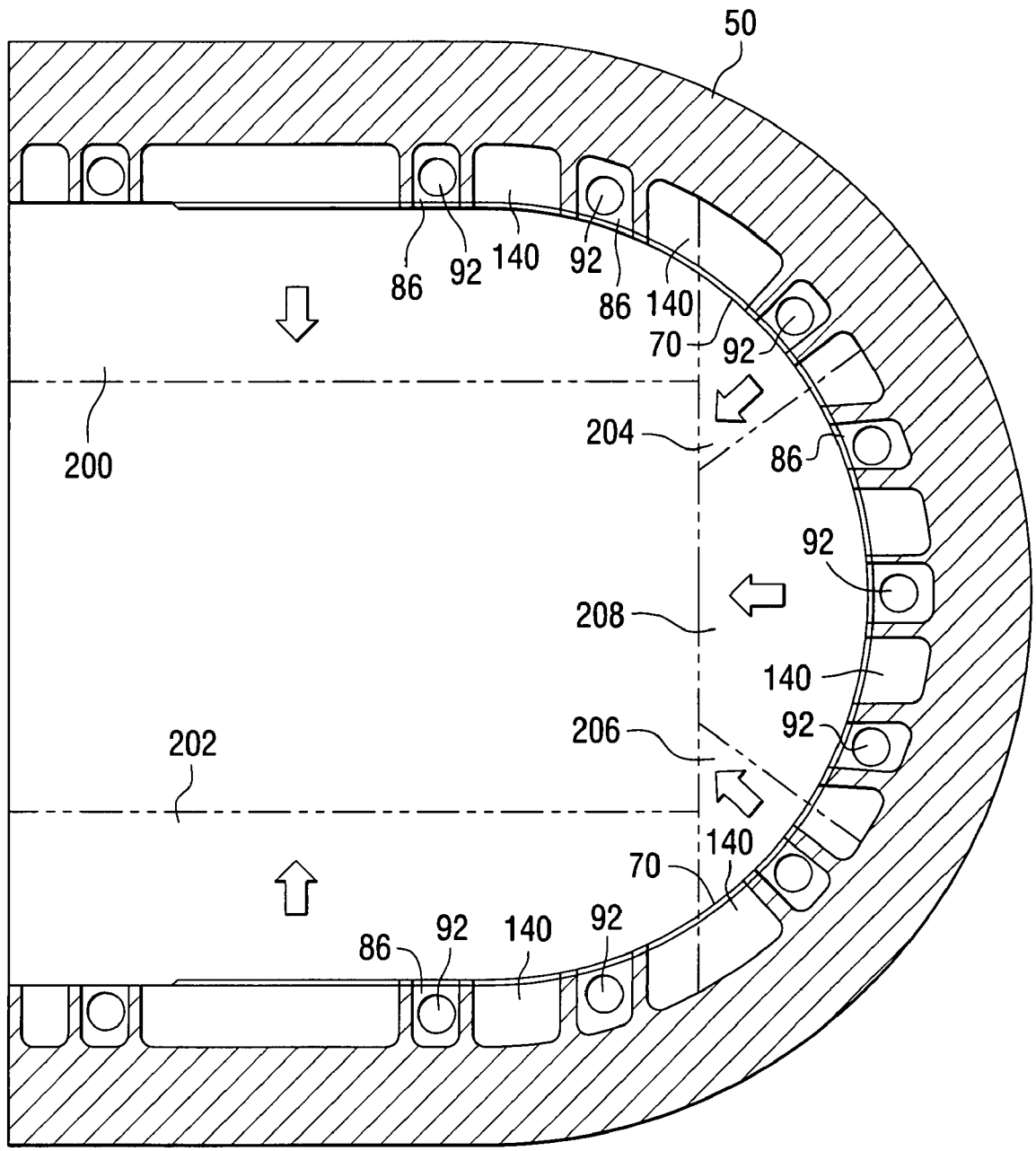
FIG. 8 shows one alternative method for manufacturing a clamp member in accordance with a preferred embodiment of the present invention.

FIG. 8 shows one method in which inserts can be used to form the cavities 86 and depressions 140. Those skilled in the art of casting techniques are well aware of the lost wax method. A model of the piece to be cast is made of wax or some other material that can easily be melted. The component shown in FIG. 8 would be made of wax to the same dimensions of the final component. After the wax piece is made, as described below, the wax component can be coated with a ceramic material to form a mold. Then the wax is melted and molten metal is poured into the mold. As a result, the final metal component is virtually identical to the wax component used to make the mold. The inserts used to cast the wax component are identified by reference numerals 200, 202, 204, 206 and 208. The inserts, which can be any material suitable for use in casting wax, are represented by phantom lines in FIG. 8 in order to show one possible technique used in casting the clamp member 50 with its plurality of cavities 86 and depressions 140. The holes shown in FIG. 8 are the lower holes 92 described above. FIG. 8 is represented as a section view with the section taken along a plane that is generally parallel to and below the upper surface 74. This particular section is selected so that the positions of the inserts can be shown in relation to the cavities 86 and depressions 140 which they are used to form. When the wax solidifies, subsequent to the wax casting process, inserts 200 and 202 can initially be removed in the directions represented by the arrows associated with those inserts. Subsequent to this procedure, inserts 204 and 206 can be removed in the directions represented by the arrows associated with them. Lastly, insert 208 can be removed in the direction of the arrow associated with it. Various alternative insert structures can be used instead of those shown in FIG. 8. Since it is significantly beneficial, from a structure standpoint, to provide the cavities and depressions on the inner surface 70, the inserts described in conjunction with FIG. 8 facilitate the manufacture of this beneficial structure. After the wax component is coated with a ceramic slurry, as is well known to those skilled in the art, it is melted and the ceramic mold is used to cast the metal object. Portions of the wax and metal components are virtually identical in location and dimension and are described as such herein.

With reference to FIGS. 1-8, it can be seen that a preferred embodiment of the present invention provides a clamp member 50 which comprises an inner surface 70 facing a central axis 130 of the clamp member 50. The use of the term "central axis" is not intended to imply the center of gravity of either of the clamp members, but merely to represent a direction relative to the cross-sectional structure of the clamp member. It is used, throughout the description of the preferred embodiment of the present invention, to facilitate the description of relative surfaces and cavities that are located radially inward and radially outward relative to the central region within the clamp member. The clamp member 50 further comprises an outer surface 72 which faces away from the central axis 130. An upper surface 74 intersects the inner surface 70 and a lower surface 76 intersects the inner surface 70. A flange 80 extends from the clamp member 50 in a direction away from the central axis 130. A plurality of cavities 86 are formed through the inner surface 70 and extend into the clamp member. In a preferred embodiment of the present invention, the cavities 80 do not extend all the way to the outer surface 72. This configuration is considered preferable because it maintains a higher strength of the overall clamp member structure and provides a smooth and continuous outer surface for the elastomeric seal. An upper plurality of holes 90 extend through the upper surface 74 and a lower plurality of holes 92 extend through the lower surface 76. Each of the upper plurality of holes 90 is aligned with an associated one of the lower plurality of holes 92 and with an associated one of a plurality of hole axes 96. Each of the hole axes 96 extends through an associated one of the plurality of cavities 86. The flange 80 has a surface 100 which extends contiguously from the upper surface 74. The flange 80 is tapered from a thickest portion 110 near the outer surface 72 to a thinnest portion 112 at a distal end of the flange 80. The clamp member 50 comprises two sections in a particularly preferred embodiment of the present invention, but it should be understood that a single oblong or round clamp member can also be used and should be considered to be within the scope of the present invention.

The two sections are separated by a plane which is generally parallel to the central axis 130 and coplanar with surfaces 120. The clamp member of a preferred embodiment of the present invention can further comprise a plurality of bolts 30, wherein each of the plurality of bolts extends through associated ones of the upper and lower plurality of holes, 90 and 92. Each of the plurality of cavities extends a partial distance through the clamp member 50 from the inner surface 70 toward the outer surface 72. In a preferred embodiment of the present invention, the cavities do not intersect the outer surface 72. The clamp member 50 can be made of stainless steel. In certain embodiments, it further comprises a plurality of depressions 140 formed through the inner surface 70 and spaced apart from the plurality of cavities 86. The flange 80 can be configured to conform to a surface of an elastomeric component 10 and exert a force against the surface of the elastomeric component when a force is exerted on the clamp member 50 in a direction generally perpendicular to and against the upper surface 74.

Although the present invention has been described with particular specificity and illustrated to show a preferred embodiment, it should be understood that alternative embodiments are also within its scope.

I claim:

1. A clamp member of a marine propulsion device, comprising:
    an inner surface facing a central axis of said clamp member;
    an outer surface facing away from said central axis;
    an upper surface intersecting said inner surface;
    a lower surface intersecting said inner surface;
    a flange extending from said clamp member in a direction away from said central axis;
    a plurality of cavities formed through said inner surface and into said clamp member;
    an upper plurality of holes extending through said upper surface;
    a lower plurality of holes extending through said lower surface, each of said upper plurality of holes being aligned with an associated one of said lower plurality of holes and with an associated one of a plurality of hole axes, each of said hole axes extending through an associated one of said plurality of cavities; and
    a plurality of depressions formed through said inner surface and spaced apart from said plurality of cavities.

2. The clamp member of claim 1, wherein:
said flange has a surface which extends contiguously from said upper surface.

3. The clamp member of claim 1, wherein:
said flange is tapered from a thickest portion proximate said outer surface to a thinnest portion at a distal end of said flange.

4. The clamp member of claim 1, wherein:
said clamp member comprises two sections.

5. The clamp member of claim 4, wherein:
said two sections are separated by a plane which is generally parallel to said central axis.

6. The clamp member of claim 1, further comprising:
a plurality of bolts, each of said plurality of bolts extending through associated ones of said upper and lower pluralities of holes.

7. The clamp member of claim 1, wherein:
each of said plurality of cavities extends a partial distance through said clamp member from said inner surface toward said outer surface.

8. The clamp member of claim 1, wherein:
said clamp member is made of stainless steel.

9. The clamp member of claim 1, wherein:
said flange is configured to conform to a surface of an elastomeric component and exert a force against said surface of said elastomeric component when a force is exerted on said clamp member in a direction generally perpendicular to and against said upper surface.

10. A clamp member of a marine propulsion device, comprising:
    an inner surface facing a central axis of said clamp member;
    an outer surface facing away from said central axis;
    an upper surface intersecting said inner surface;
    a lower surface intersecting said inner surface;
    a flange extending from said clamp member in a direction away from said central axis, said flange having a surface which extends contiguously from said upper surface;
    a plurality of cavities formed through said inner surface and into said clamp member;
    an upper plurality of holes extending through said upper surface;
    a lower plurality of holes extending through said lower surface, each of said upper plurality of holes being aligned with an associated one of said lower plurality of holes and with an associated one of a plurality of hole axes, each of said hole axes extending through an associated one of said plurality of cavities;
    a plurality of bolts, each of said plurality of bolts extending through associated ones of said upper and lower pluralities of holes; and
    a plurality of depressions formed through said inner surface and spaced apart from said plurality of cavities.

11. The clamp member of claim 10, wherein:
said flange tapered from a thickest portion proximate said outer surface to a thinnest portion at a distal end of said flange.

12. The clamp member of claim 11, wherein:
said clamp member comprises two sections.

13. The clamp member of claim 12, wherein:
said two sections are separated by a plane which is generally parallel to said central axis.

14. The clamp member of claim 11, wherein:
each of said plurality of cavities extends a partial distance through said clamp member from said inner surface toward said outer surface.

15. The clamp member of claim 10, wherein:
said flange is configured to conform to a surface of an elastomeric component and exert a force against said surface of said elastomeric component when a force is exerted on said clamp member in a direction generally perpendicular to and against said upper surface.

16. A clamp member of a marine propulsion device, comprising:
    an inner surface facing a central axis of said clamp member;
    an outer surface facing away from said central axis;
    an upper surface intersecting said inner surface;
    a lower surface intersecting said inner surface;
    a flange extending from said clamp member in a direction away from said central axis, said flange having a surface which extends contiguously from said upper surface, said clamp member comprising two sections, said flange being configured to conform to a surface of an elastomeric component and exert a force against said surface of said elastomeric component when a force is exerted on said clamp member in a direction generally perpendicular to and against said upper surface;

a plurality of cavities formed through said inner surface and into said clamp member, each of said plurality of cavities extending a partial distance through said clamp member from said inner surface toward said outer surface;

an upper plurality of holes extending through said upper surface;

a lower plurality of holes extending through said lower surface, each of said upper plurality of holes being aligned with an associated one of said lower plurality of holes and with an associated one of a plurality of hole axes, each of said hole axes extending through an associated one of said plurality of cavities a plurality of depressions formed through said inner surface and spaced apart from said plurality of cavities; and a plurality of bolts, each of said plurality of bolts extending through associated ones of said upper and lower pluralities of holes.

17. The clamp member of claim 16, wherein:

said flange is tapered from a thickest portion proximate said outer surface to a thinnest portion at a distal end of said flange; and said two sections are separated by a plane which is generally parallel to said central axis.

* * * * *